US010810585B2

(12) United States Patent
Kadiwala et al.

(10) Patent No.: US 10,810,585 B2
(45) Date of Patent: Oct. 20, 2020

(54) SYSTEMS AND METHODS FOR AUTHENTICATING USERS IN CONNECTION WITH MOBILE OPERATIONS

(71) Applicant: MASTERCARD INTERNATIONAL INCORPORATED, Purchase, NY (US)

(72) Inventors: Asif Kadiwala, Vadodara (IN); Nirmish Dholakia, Rajkot (IN); Sunil Mishra, Vadodara (IN); Chao Zeng, Livingston, NJ (US); Hemant Bhanushali, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 227 days.

(21) Appl. No.: 16/029,095

(22) Filed: Jul. 6, 2018

(65) Prior Publication Data

US 2020/0013051 A1    Jan. 9, 2020

(51) Int. Cl.
*G06Q 20/38* (2012.01)
*H04W 12/06* (2009.01)
(Continued)

(52) U.S. Cl.
CPC ....... *G06Q 20/3829* (2013.01); *G06Q 20/202* (2013.01); *G06Q 20/322* (2013.01);
(Continued)

(58) Field of Classification Search
None
See application file for complete search history.

(56) References Cited

U.S. PATENT DOCUMENTS 9,503,894 B2 * 11/2016 Shanmugam ....... H04L 63/0853
2012/0072736 A1 * 3/2012 Kudoh ................. H04L 9/3226
713/189
(Continued)

FOREIGN PATENT DOCUMENTS

WO    WO2014/081390         5/2014
WO    WO-2015079196 A1 *   6/2015  ........... H04L 9/3226
(Continued)

*Primary Examiner* — Jacob C. Coppola
(74) *Attorney, Agent, or Firm* — Harness, Dickey & Pierce, P.L.C.

(57) ABSTRACT

Systems and methods provide multi-function authentication. One exemplary method includes receiving a request to opt into multi-function authentication. A primary operation-based key is generated by the communication device, the operation-based key accessible based on authentication of the user and available for use after the authentication. The primary key is imported, by an application, into a secure key data structure, such that it is only accessible by the application. When the biometric authentication of the user is successful, the communication device transmits to an account server an indication that the user is eligible for multi-function authentication. The communication device receives a time-based secondary key from the account server, wherein the time-based key is useable only during a defined interval. The application links the secondary key to the primary key and imports the secondary key into the data structure such that it is only accessible via the primary key.

20 Claims, 8 Drawing Sheets

(51) Int. Cl.
    *H04L 29/06*     (2006.01)
    *G06Q 20/40*     (2012.01)
    *G06Q 20/20*     (2012.01)
    *G06Q 20/32*     (2012.01)
    *G06Q 20/36*     (2012.01)

(52) U.S. Cl.
    CPC ......... *G06Q 20/36* (2013.01); *G06Q 20/3823* (2013.01); *G06Q 20/4012* (2013.01); *G06Q 20/40145* (2013.01); *H04L 63/068* (2013.01); *H04L 63/083* (2013.01); *H04L 63/0861* (2013.01); *H04W 12/06* (2013.01); *G06Q 2220/00* (2013.01); *H04L 2463/082* (2013.01)

(56) References Cited

U.S. PATENT DOCUMENTS

| | | | |
|---|---|---|---|
| 2012/0150742 A1* | 6/2012 | Poon | H04L 63/0869 705/44 |
| 2013/0262873 A1* | 10/2013 | Read | H04W 12/06 713/186 |
| 2014/0156531 A1* | 6/2014 | Poon | G06Q 20/3229 705/44 |
| 2014/0279558 A1 | 9/2014 | Kadi et al. | |
| 2016/0057619 A1* | 2/2016 | Lopez | G06F 9/455 380/247 |
| 2016/0086172 A1* | 3/2016 | Kamal | G06F 21/62 705/71 |
| 2016/0162883 A1* | 6/2016 | Liscia | G06K 19/06206 705/71 |
| 2016/0180343 A1* | 6/2016 | Poon | G06Q 20/20 705/75 |
| 2016/0191499 A1* | 6/2016 | Momchilov | H04L 9/0863 713/171 |
| 2017/0373828 A1* | 12/2017 | Michiels | G06F 21/75 |
| 2018/0005209 A1 | 1/2018 | Ranganathan et al. | |
| 2019/0139029 A1* | 5/2019 | Kadiwala | G06Q 20/40 |
| 2019/0334884 A1* | 10/2019 | Ross | H04L 63/0442 |

FOREIGN PATENT DOCUMENTS

| | | | | |
|---|---|---|---|---|
| WO | WO2015/150917 | | 10/2015 | |
| WO | WO-2016090140 A1 | * | 6/2016 | ......... G06Q 20/3572 |
| WO | WO-2018156333 A1 | * | 8/2018 | ........... H04L 9/0897 |

* cited by examiner

SYSTEMS AND METHODS FOR AUTHENTICATING USERS IN CONNECTION WITH MOBILE OPERATIONS

FIELD

The present disclosure generally relates to a computer system and computer-implemented method for authenticating users in connection with mobile operations. In particular, the present disclosure relates to multi-function authentication of users at computing devices, where the authentication provides access to different keys, with at least one of the keys protected by at least another one of the keys.

BACKGROUND

This section provides background information related to the present disclosure which is not necessarily prior art.

Authentication of users in connection with payment account transactions is a conventional part of initiating the transactions. The users may be authenticated through physical documents (e.g., government IDs, etc.) in the possession of the users, etc., or through information known to the users, such as, personal identification numbers or PINs, passwords, etc., or through information specific and/or unique to the users, such as, for example, biometrics (e.g., fingerprints, facial images, palm prints, etc.), etc. When the information is received, for example, it is compared against reference information, whereupon the users are authenticated when there is a match (within conventional standards). The authentication may be facilitated by merchants involved in the transactions, for example, at point-of-sale (POS) terminals, at which the users enter or provide the above information. The POS terminals may compare the information locally, or provide the information elsewhere for comparison (e.g., to issuers of payment accounts involved in the transactions, etc.). In addition, with the advent of electronic wallets (or virtual wallets), which include payment account credentials (e.g., payment tokens, etc.) for payment accounts, authentication of the users may be completed via the electronic wallets, at communication devices of the user comprising the wallets, such that access to the electronic wallets and/or the credentials therein are conditioned on authentication of the users.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

For payment applications associated with users, upon authenticating the users, the payment applications may be enabled to share payment account credentials, such as payment tokens, associated with payment accounts at the payment applications with merchants in proximity to communication devices including the payment applications. Such authentication is generally limited to one operation, i.e., use of the credentials to effect payments to the merchants via the payment accounts, whereby other operations associated with the payment applications or other applications require additional authentication. These "operation-based" keys are therefore typically one-time use keys per authentication, while other keys in the communication devices may be time-based keys, which are accessible and/or useable for defined intervals. What's more, when multiple keys are included in the communication devices, which relate to different operations, security suggests and/or requires that the keys be deleted and/or restricted based on the addition of new users to the communication devices (e.g., for which authentication credentials are added, etc.). In this manner, payment account credentials may be limited to authorized users, not merely users which may be authenticated to the communication devices.

Uniquely, the systems and methods herein provide a dual key scheme, whereby a primary key (e.g., an operation-based key, etc.) is accessible at a user's communication device, by authentication of the user to the communication device, and protects a secondary key (e.g., a time-based key, etc.) associated with a third party. In this manner, a single authentication of the user provides access to both keys, with the primary key employed for one operation (for payment via a payment application, for example) and the secondary key employed for another operation (e.g., interactions with the third party, etc.), without the user being authenticated multiple times to access the multiple keys.

Figure 1:
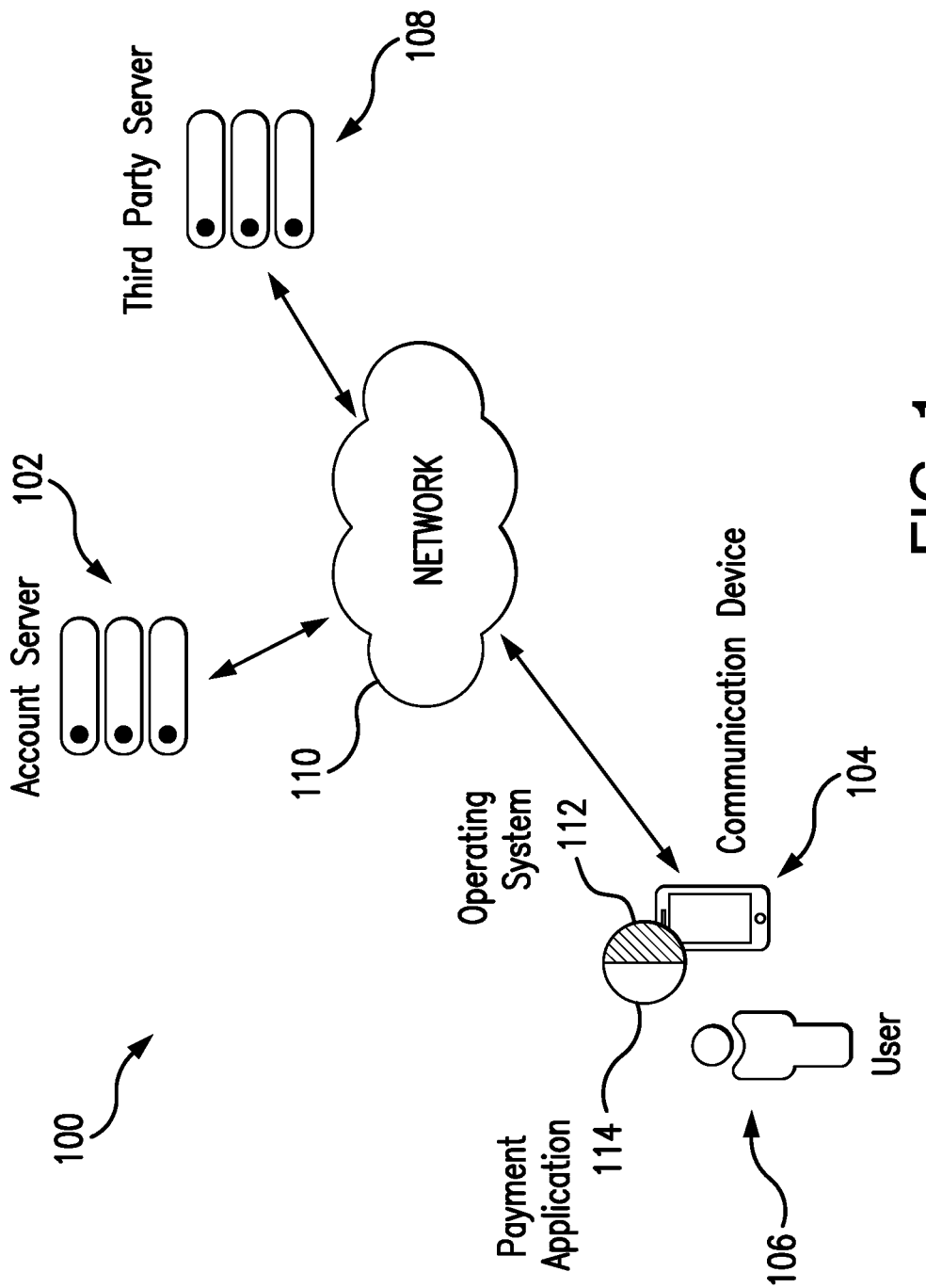
FIG. 1 is an exemplary system of the present disclosure suitable for use in managing access to multiple keys, which enable multi-function authentication operations to be implemented to authenticate a user.

FIG. 1 illustrates a system 100 for providing and/or managing access to multiple keys included in a communication device, in association with an account (e.g., a wallet account, etc.), and usable to facilitate various different operations in connection with the communication device. Although the system 100 is presented in one arrangement, other embodiments may include the parts of the system 100

(or other parts) arranged otherwise depending on, for example, relationships among users with payment networks and/or third parties, particular types of communication devices and/or keys utilized in the system 100, security requirements, privacy requirements, etc.

As shown in FIG. 1, the system 100 includes an account server 102, a communication device 104 associated with a user 106, and a third party server 108, each coupled in and/or in communication through a network 110. The network 110 may include, for example, one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In this exemplary embodiment, the account server 102 includes a wallet server associated with a payment network, such as, for example, the MasterCard® payment network, etc. The account server 102 is configured to interact with one or more payment applications, when installed and active in communications devices (such as communication device 104), to facilitate provisioning of payment account credentials and/or payments based on the credentials. This is explained further below. The account server 102 may be associated with different types of accounts, other than wallet payment accounts, in other embodiments, whereby access to keys provided herein may be employed for operations other than payment operations and/or payment related operations.

The communication device 104 illustrated in the system 100 may include, for example, a mobile phone, a smartphone, a tablet, a personal digital assistant (PDA), a key fob, a transponder device, an NFC-enabled device, or other computing device, etc. as desired. The communication device 104 includes an operating system 112 (e.g., an Android® operating system, etc.), which causes the communication device 104 to operate as described herein. In particular, the communication device 104 is configured, by the operating system 112, to provide a key data structure, such as, for example, the Android® Keystore, etc., which permits keys to be securely stored therein. In addition to the operating system 112, the communication device 104 further includes a payment application 114. The payment application 114 may include any suitable wallet or virtual wallet application, such as, for example, the MasterPass® wallet, etc. whereby the user 106 is able to provision a payment account credential associated with a payment account to the payment application 114. In particular, the communication device 104, as configured by the payment application 114, is provisioned with the payment account credential associated with the payment account. In this exemplary embodiment, a third party (associated with the third party server 108) includes an issuer bank, which issued the payment account to the user 106. The payment account credential (e.g., a payment token, etc.) for the payment account is provisioned and stored, by the communication device 104, as configured by the payment application 114, in memory of the communication device 104, so that the payment account credential may be employed to identify the payment account for funding a transaction. It should be appreciated that the third party may be a different entity in one or more other embodiments, often where the third party engages in and/or relies on communication with the account server 102 and/or the communication device 104, in connection with a payment account transaction, or not, etc.

Figure 2:
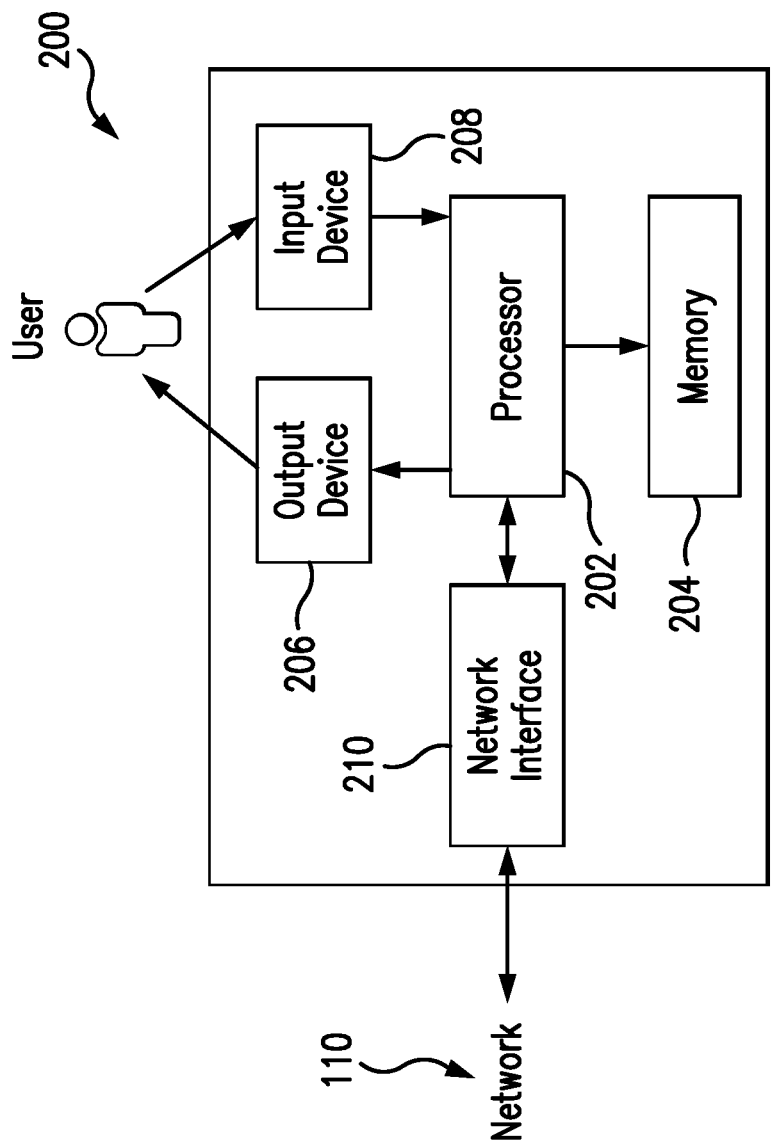
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the account server 102, the communication device 104 and the third party server 108 may include and/or may be generally consistent with the computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, keys, credentials, ciphers, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes an output device 206 that is coupled to (and is in communication with) the processor 202 (however, it should be appreciated that the computing device 200 could include one or more additional output devices other than the output device 206, etc.). The output device 206 outputs information (e.g., payment account credentials, etc.), visually or audibly, for example, to a user of the computing device 200, etc. And, various interfaces may be displayed at computing device 200, and in particular, at the output device 206, which are related to the operations herein (e.g., prompts to provide biometrics, PINs, error messages, etc.). The output device 206 may include, without limitation, a presentation unit such as a liquid crystal display (LCD), a light-emitting diode (LED) display, an organic LED (OLED) display, an "electronic ink" display, speakers, etc.; another computing device; etc., or combinations therein.

In addition, the computing device 200 includes an input device 208 that receives inputs from the user (i.e., user inputs) of the computing device 200 such as, for example, biometrics, PINs, etc., as further described below; etc. The input device 208 may include a single input device or multiple input devices. The input device 208 is coupled to (and is in communication with) the processor 202 and may include, for example, one or more of a keyboard, a pointing device, a biometric scanner (e.g., a fingerprint scanner, camera, etc.), a mouse, and/or a touch sensitive panel (e.g., a touch pad or a touch screen, etc.), another computing device, and/or an audio input device. In various exemplary embodiments, a touch screen, such as that included in a tablet, a smartphone, or similar device, may behave as both the output device 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different ones of the networks herein, including network 110, and/or with other devices described herein. In some exemplary embodiments, the computing device 200 may include the processor 202 and one or more network interfaces incorporated into or with the processor 202.

Referring again to FIG. 1, the account server 102, the communication device 104 and the third party server 108 are configured to cooperate to provide multi-function authentication of the user 106, for example, whereby upon authentication of the user 106, once, multiple operations may be initiated, through different keys, while each key is/remains protected through the authentication.

At the outset, the user 106 is registered for the payment application 114. Specifically, the communication device 104, as configured by the payment application 114, receives a request from the user to register a payment account issued by third party (e.g., an issuer, etc.) associated with the third party server 108 and provides the request to the account server 102. In response to the request, the account server 102 is configured to validate the user 106 with the third party server 108 and to generate a secondary key for the user 106. The secondary key may be a symmetric key or an asymmetric key pair. In this example, the key generated by the account server 102 includes a symmetric key, which is a time-based key. As such, the key is suitable for use for a predefined interval after access, where the predefined interval may include two seconds, five seconds, a minute, or some other suitable interval, etc. The account server 102 then is configured to notify the third party server 108 of the generated key and/or the registration and to store the secondary key in memory (e.g., the memory 204 of the account server 102, etc.).

Then, the account server 102 is configured to generate a signed and/or encrypted payload, using the secondary key, and to provide the signed and/or encrypted payload to the payment application 114 in the communication device 104. The payload generally includes confidential data, such as, for example, a device token that uniquely identifies the communication device 104. The device token may be provided to the account server 102 by the third party server 108 associated with the payment account issued by the third party. In response, the communication device 104, as configured by the payment application 114, stores the signed and/or encrypted payload (including the device token in this embodiment) in memory (e.g., the memory 204, etc.). It should be appreciated that the device token may then later be used by the third party server 108 to authenticate the communication device 104.

Thereafter, the communication device 104, as configured by the payment application 114, receives a request from the user 106 to enroll or opt into the multi-function authentication and verifies that the communication device 104 is eligible for multi-function authentication. In configuring the communication device 104 as such, it should be appreciated that the payment application 114 may, in one or more embodiments, leverage one or more parts (e.g., public APIs, etc.) of the operating system 112 of the communication device 104 to verify eligibility and, potentially, to ensure the communication device 104 is not tampered with by a malicious user. Once verified, the communication device 104, as configured by the payment application 114, generates a primary key for the communication device 104 and the communication device 104, as configured by the operating system 112, stores the primary key in memory (e.g., the memory 204, etc.), for example, in response to payment application 114 passing the primary key to the operating system 112 for storage.

That said, in configuring the communication device 104 to generate the primary key, it should be appreciated that the payment application 114 may, in one or more embodiments, cooperate with the operating system 112 or parts thereof. For example, the payment application 112 may leverage one or more parts of the operating system 112 (e.g., a public API, etc.) to generate the primary key, where, for example, the payment application 114 may call an API of the operating system 112 to create the primary key based on details provided to the API by the payment application 114, such as, for example, key length, the algorithm or type thereof to generate the primary key, and/or the crypto operation for which the primary key is to be created (e.g., encryption, sign, etc.). The communication device 104, then, as configure by the operating system 112, creates the primary key (e.g., based on the provided details) and stores the primary key in memory (e.g., the memory 204, etc.). Specifically, in the embodiment of FIG. 1, the communication device 104 is configured, by the operating system 112, to store the primary key in the key data structure and, in this embodiment, a secure key store (e.g., the Android® Keystore, etc.) in a trusted execution environment (TEE) of the operating system 112.

In this manner, it should be appreciated that the communication device, as configured by payment application 114, imports the primary key into the key data structure (via one or more interactions with the operating system 112, including, for example, a call to the operating system 112 to create and/or store the primary key, whereupon the operating system creates the primary key and/or stores the primary key in the key data structure). The TEE is a secure area of the main processor of the operating system 112 where code and data loaded therein is protected with respect to their integrity and confidentiality. In various embodiments, the primary key may be securely stored in the key data structure, from which the primary key can be subsequently retrieved during authentication processes to initialize a cipher object for decrypting and/or verifying an encrypted and/or signed transaction personal identification number (PIN) (e.g., a virtual wallet PIN, etc.), for example, to authenticate a contactless payment transaction. Like above, the primary key may be a symmetric key or an asymmetric key pair. In the embodiment of FIG. 1, the primary key is an asymmetric key pair. However, one or more other embodiments may be implemented using a symmetric private key. In any case, it should be appreciated that the primary key is stored such that only the payment application 114 can access the primary key. In this manner, the primary key is protected from access by other applications on the communication device 104.

With continued reference to FIG. 1, in connection with the enrollment or opt in request, the communication device 104, as configured by the payment application 114, solicits the user 106 to enter a user identifier input at the communication device 104. In connection therewith, the payment application 114 requests that the operating system 112 accept the user identifier input and authenticate the user. Then, when the user 106 responds, the communication device 104, as configured by the operating system 112, receives the user identifier input and authenticates the user 106 in a conventional manner (e.g., by comparing the user identifier input to a stored reference, etc.) (e.g., locally at the communication device 104, remotely via a third party server 108 associated with the issuer with the issuer, via the account server 102, or via another computing device 200 (e.g., a back end server, etc.). The user identifier input may be one of the following: a biometric, a fingerprint, a facial recognition, an iris recognition, a voice recognition, a gesture, a PIN, or a password. If the user 106 is not authenticated, the communication device 104, as configured by the operating system 112, notifies the payment application 114 of the unsuccessful authentication and the communication device 104, as configured by the payment application 114 may request another user identifier input or terminate the enrollment process. If the user 106 is authenticated, then, the communication device 104, as configured by the operating system 112, notifies the payment application 114 of the successful authentication, whereupon the communication device 104, as configured by the payment application 114, notifies the account server 102 of the request to enroll and the successful authentication of the user 106, and, in connection therewith, provides a public key of the primary key pair to the account server 102.

In response, the account server 102 is configured to store the primary key (i.e., the public key of the primary key pair) and to provide a transaction PIN (e.g., a virtual wallet PIN) encrypted with the public key of the primary key pair to the communication device 104 and to provide the secondary key (i.e., the time-based key) to the communication device 104, whereby the payment application 114 of the communication device 104 receives the secondary key. That said, in one or more other embodiments (e.g., where a symmetric primary key is used and/or the transaction PIN is already stored at the communication device 104 (e.g., in encrypted form), there may be no need for the communication device 104 to provide a primary key to the account server and/or for the account server 102 to provide a transaction PIN to the communication device 104. In addition, it should be understood that the secondary key provided to the communication device 104 is the same secondary key used by the account server 102 to encrypt the signed and/or encrypted payload as part of the registration process discussed above. With that said and continued reference to FIG. 1, upon receipt of the encrypted transaction PIN and the secondary key (and, potentially, other data), the communication device 104, as configured by the payment application 114, stores the encrypted transaction PIN in memory (e.g., the memory 204, etc.) until a successful transaction using the transaction PIN is completed (e.g., caches the encrypted transaction PIN for a transient amount of time, etc.), whereupon the encrypted transaction PIN is deleted from the memory (e.g., cleared from the cache, etc.).

The communication device 104, as configured by the payment application 114, then, may access the encrypted transaction PIN (e.g., before the encrypted transition PIN is deleted from memory) and decrypt the encrypted transaction PIN using the private key of the primary key pair during user authentication for a contactless payment (e.g., an NFC payment, etc.). The communication device 104, as configured by the payment application 114, also imports the secondary key, as subordinate to the primary key, into the key data structure therein (again, in this embodiment, a secure key store in a trusted execution environment (TEE) of the operating system 112, wherein the communication device 104, as configured by the operating system 112, stores the secondary key, as subordinate to the primary key, in the key data structure. In importing the secondary, it should be appreciated that the communication device 104, as configured by the payment application 114, passes the secondary key to the operating system 112, such that the communication device 104, as configured by the operating system 112, may store the secondary key, as subordinate to the primary key, into the key data structure. In connection therewith, the communication device 104, as configured by the payment application 114, programmatically links the primary key to the secondary key in a manner wherein the secondary key is only accessible upon access to the primary key in the key data structure, such that the payment application 114 will only attempt to access the secondary key in the key data structure if the primary key is successfully accessed in the key data structure.

Specifically, for example, when the primary key is generated, by the communication device 104, as configured by the application 114, and when the primary and secondary keys are stored by the communication device, as configured by the operating system 112 (e.g., after receipt in the case of the secondary key, etc.), the communication device 104, as configured by the payment application 114, imports the keys into the key data structure in a manner such that only the payment application 114 can access the keys (e.g., in a key store in a TEE, etc.) (e.g., using Android OS security, etc.) and wherein the payment application 114 will only attempt to access the secondary key if the primary key is successfully accessed. In this manner, the keys are protected from access by other applications on the communication device 104. In connection therewith, communication device 104, as configured by the payment application 114, employs logic dictating that the secondary key (as linked to the primary key) will only be accessible by the payment application 114 if the primary key is accessed successfully (i.e., if the primary key cannot be accessed (e.g., due to a failure, etc.), the secondary key cannot be accessed).

In view of the above, the user 106 is registered and enrolled in the multi-function authentication with the primary key included in the communication device 104, and the communication device 104 is situated to provide access to the secondary key when the user 106 is authenticated. Subsequently, the user attempts to access the payment application 114 at the communication device 104 to initiate a payment account transaction. In response, the communication device 104, as configured by payment application 114, prompts the user 106 to provide a user identifier input (e.g., a biometric or other input consistent with that discussed above) and attempts to authenticate the user 106, based on the user identifier input provided by the user 106, for use of the primary key. When the authentication fails, the communication device 104, as configured by the payment application 114, may prompt the user 106 to reenter the user identifier input or may inhibit access to the payment application 114, whereby the payment account transaction will not be performed and/or initiated.

Conversely, when the user is authenticated, the communication device 104, as configured by the payment application 114, retrieves a cipher object for the data, to use the cipher object and the primary key to decrypt the transaction PIN, which is stored in memory of the communication device 104 in an encrypted form (consistent with the discussion above); and to use the decrypted transaction PIN, together with a token associated with the payment account (broadly, a payment token) and stored securely in the payment application 114, to generate a cryptogram for the payment account transaction (e.g., to pass to an NFC-enabled POS terminal via NFC so that the payment account transaction may be processed, etc.). It should be appreciated that the payment token is different from the device token in the exemplary system 100 of FIG. 1 and is already stored in the payment application 114 based on a prior digitization of a payment card associated with the payment account of the user 106. In addition, the communication device 104, as configured by the payment application 114, accesses the secondary key, based on the user 106 being authenticated for use of the primary key.

In connection with accessing the secondary key, the communication device 104, as configured by the payment application 114, may request that the operating system 112 retrieve the secondary key, where the request includes an identification of the secondary key. If the user 106 has been authenticated for use of the primary key, the communication device 104 device, as configured by the operating system 112, may then retrieve the secondary key and return the secondary key to the payment application 114. The communication device 104, as configured by the payment application 114, then provides a service call to the third party server 108, where the service call (and/or data included therein) is encrypted and/or signed by the secondary key. In connection therewith, it should be appreciated that the payment application 114 will request that the operating system 112 (e.g., a public API thereof, etc.) encrypt and/or sign the service call (and/or data included therein) using the secondary key (e.g., passed to the public API as part of the request, etc.). The operating system 112, then, will perform the encryption and/or signing and return the encrypted and/or signed service call (and/or data) to the payment application 114, whereby the communication device, as configured by the payment application 114, may then provide the service call to the third party server 108.

Moreover, the communication device 104, as configured by the operating system 112, deletes the primary key when a new user, and specifically, a new user identifier input (e.g., biometric, etc.), is added to the communication device 104. In this manner, the operating system 112 limits access to keys in the key data structure to specific users, so that keys, such as the primary key, which permits access to the payment account credential(s) stored at the communication device 104, may not be accessed by later added users. When the user 106 attempts a payment account transaction, after the primary key is deleted, as described above, the communication device 104, as configured by the payment application 114, recognizes that the primary key is deleted, opts the user 106 out of the multi-function authentication, and requests that operating system 112 delete the secondary key from the key data structure in the communication device 104. The communication device 104, as configured by the operating system 112, then, deletes the secondary key from the key data structure in response to the request.

With that said, several different exemplary methods are described below in FIGS. 3-7 with reference to the account server 102, the communication device 104 and the third party server 108, and generally the system 100, with additional references to the computing device 200. It should be appreciated, though, that the methods herein are not limited to the system 100 and the computing device 200, and, likewise, the systems and devices herein are not limited to the specific methods in FIGS. 3-7.

Figure 3:
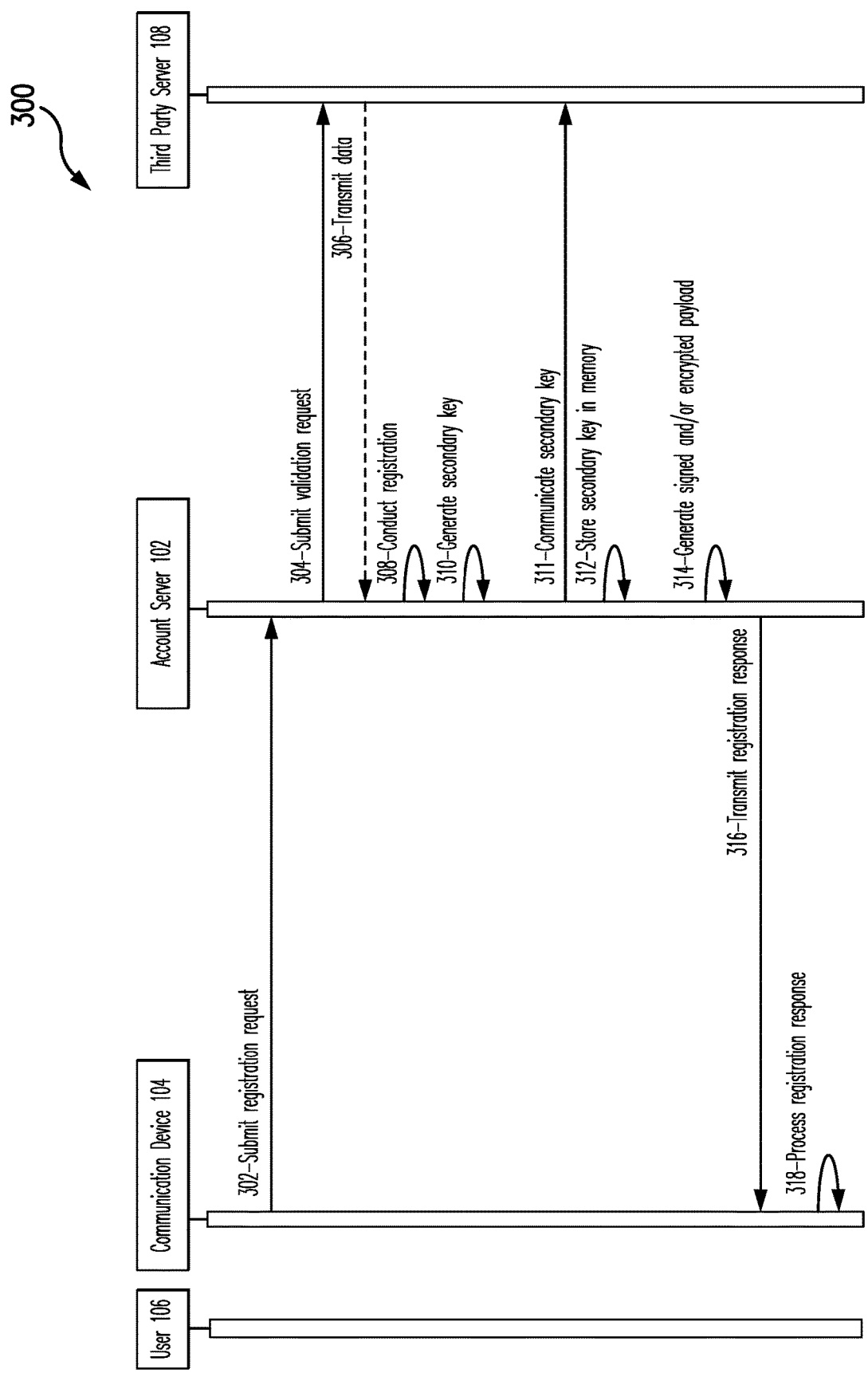
FIG. 3 is a flow diagram of an exemplary method, which may be implemented in connection with the system of FIG. 1, for registering the user to a payment application, whereby a time-based key, for a third party, is generated and stored.

FIG. 3 is an exemplary method 300 for use in registering the communication device 104 for multi-function authentication. At the outset, it is assumed that the user 106 has downloaded the payment application 114 into the communication device 104, the user 106 has registered a wallet account with the account server 102, and the user 106 has a payment account issued for and/or by the third party associated with the third party server 108, which, in this example, is an issuer bank.

As part of the registration of the payment application 114, the user 106 requests the registration through the payment application 114 of communication device 104, whereby the payment application 114 of the communication device 104, at 302, submits a registration request to the account server 102. In turn, the account server 102 attempts to validate the user 106 with the third party server 108, whereby the account server 102, at 304, submits a validation request to the third party server 108. It should be appreciated that the validation request may include details specific to the user 106 and/or communication device 104 (e.g. a unique identifier of the user 106, device parameters, etc.), which may, or may not, be obtained from the communication device 104 by the account server 102 via the registration request at 302, or simultaneously therewith. The third party server 108 may then validate the user- and/or device-specific details (e.g., by comparing the details to reference details stored at the third party server, etc.). In any case, with continued reference to method 300 of FIG. 3, in response to the validation request, the third party server 108, at 306, transmits data, specifically, user data (e.g., a device token unique to the communication device 104, etc.) and/or other confidential data (e.g., a business token(s), etc.)), indicative of the user 106, back to the account server 102. The account server 102 then proceeds to conduct registration of the user 106, at 308, in a conventional manner thereby registering the payment account issued by the third party to the wallet account of the user 106 (at the payment application 114), whereby the payment account may be used, for example, to fund a payment account transaction to the payment account issued by the third party (e.g., as part of a "Tap n' Pay" or contactless payment transaction, etc.), to allow the user 106 to view payment account history via the payment application 114; etc.

In addition, in connection therewith, in the method 300, the account server 102 generates, at 310, a secondary key, specific and/or unique to the user 106 and/or the communication device 104. In this example, the secondary key includes a time-based key, which is a key that, once accessed, for example, through authentication, is available for a predefined interval before a further authentication is necessary to access (or re-access) the key. Once generated, the account server 102, at 311, communicates (e.g., propagates, etc.) the secondary key to the third party server 108 (e.g., via a SetTimeBasedKey or other API, etc.). Thereafter, the account server 102, at 312, stores the secondary key in memory (e.g., in a database, etc.) of the account server 102.

However, it should be appreciated that in one or more other embodiments, the secondary key may be stored in memory before the secondary key is communicated to the third party server 108 (or concurrently therewith).

With continued reference to FIG. 3, the account server 102, then, generates, at 314, a signed and/or encrypted payload, which includes the data, indicative of the user, transmitted by the third party server 108, at 306, to the account server 102, in whole or in part (e.g., including a device token unique to the communication device 104, etc.). The payload is signed and/or encrypted by the account sever 102 using the secondary key. The account server 102 in turn transmits a registration response to the communication device 104, at 316. The registration response includes the signed and/or encrypted payload along with conventional registration details for the user 106, whereby the payment account is provisioned to the payment application 114 in the communication device 104. In connection therewith, the payment application 114 of the communication device 104, at 318, processes the registration response, wherein the signed and/or encrypted payload (e.g., including the device token, etc.) is stored (e.g., cached, etc.) by the payment application 114 of the communication device in memory (e.g., the memory 204, etc.).

It should again be appreciated that the secondary key may be a symmetric key or an asymmetric key pair. When it is an asymmetric key pair, the asymmetric key pair comprises a private key and a public key. In particular, encryption/decryption algorithms involving a symmetric key use the same key (e.g., a secret, etc.) for both encryption and decryption processes. Conversely, encryption/decryption algorithms involving an asymmetric key pair use different keys for encryption and decryption (e.g., the private key for encryption and the public key for decryption, etc.). In this exemplary embodiment, the account server 102 generates a symmetric key for use as the secondary/time-based key. In other embodiments, though, an asymmetric key pair may be generated, by the payment application 114 of the communication device 104, for example, and shared as described below. For example, as should be understood, the account server 102 in method 300 of FIG. 3 could, in one or more other embodiments, generate, at 310, an asymmetric key pair; communicate, at 311, the public key to the third party server; store, at 312, the public key; and generate, at 314 the signed and/or encrypted payload using the private key of the secondary key pair, whereby the payload (e.g., including the device token) may later be decrypted or verified using the public key of the secondary key pair.

Figure 4:
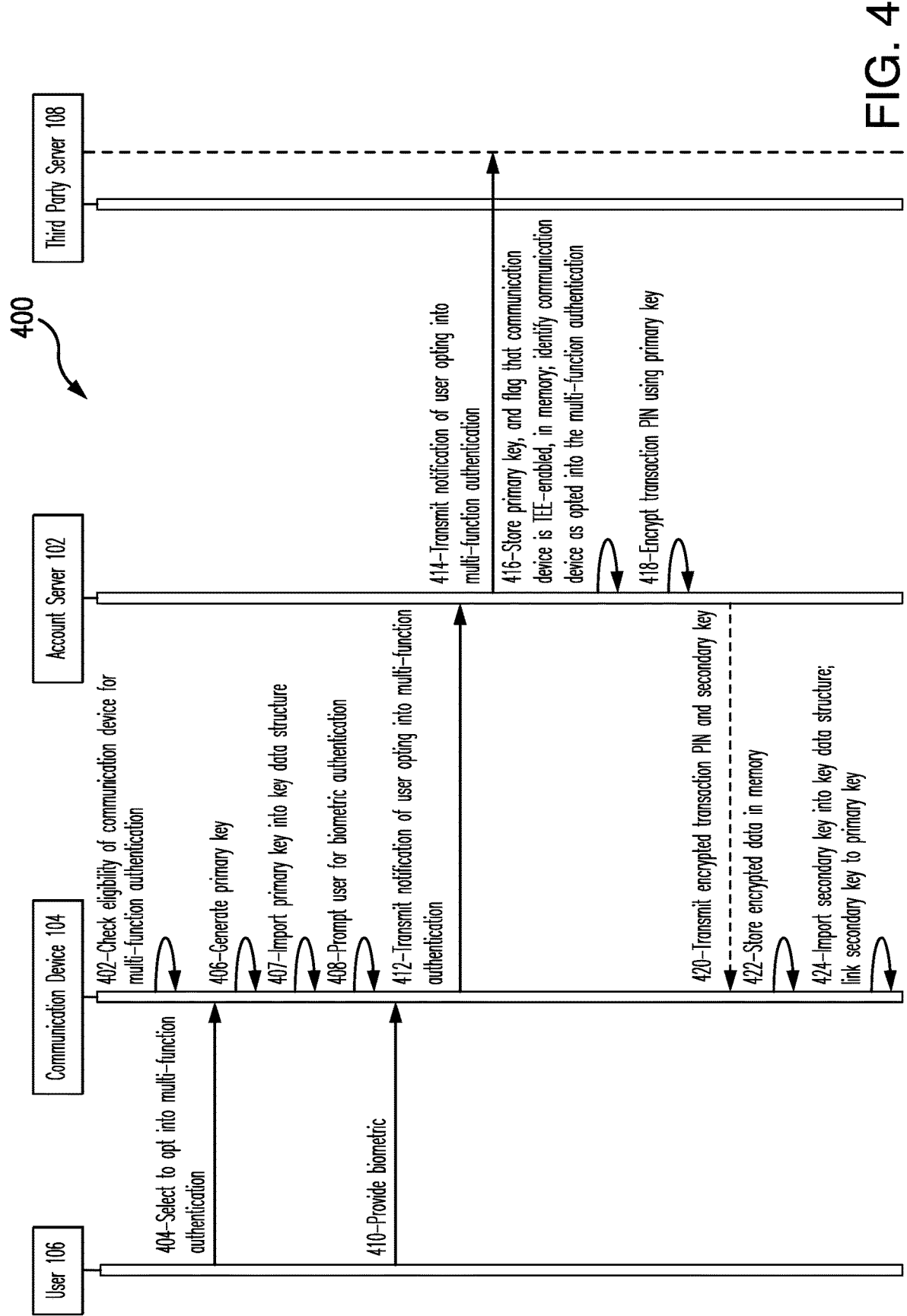
FIG. 4 is a flow diagram of an exemplary method, which may be implemented in connection with the system of FIG. 1, for the user to opt into a multi-function authentication feature, whereby an operation key and the time-based key from FIG. 3 is stored in a communication device associated with the user.

Once the payment application 114 is registered, as described above with respect to method 300 of FIG. 3, the user 106 then is provided the opportunity to opt into and/or enroll in multi-function authentication (e.g., via the payment application 114, etc.). FIG. 4 is an exemplary method 400 for the user 106 to opt into the multi-function authentication. In connection therewith, the payment application 114 associated with the user's payment account checks, at 402, for the eligibility of the communication device 104 for multi-function authentication (e.g., including offline authentication, etc.), such that the payment application 114 determines the eligibility thereof. For example, the payment application 114 checks whether the operating system 112 of the communication device 104 supports authentication operations required for the multi-function authentication (e.g., that the operating system 112 is of a sufficient version (e.g., Android® 6.0 OS or above, etc.); whether the communication device 104 includes a trusted execution environment (TEE) (i.e., whether the device 104 is TEE-enabled); whether the communication device 104 includes a biometric sensor; and/or whether the communication device 104 includes at least one enrolled biometric reference (e.g., enrolled with the operating system 112 and stored locally in memory of the communication device 104, etc.) (e.g., a fingerprint reference, etc.).

Once the eligibility of the communication device 104 is checked and determined, the user 106 selects, at 404, to opt into the multi-function authentication and, in response, the payment application 114 generates, at 406, a primary key (i.e., an operation-based key). At 407 (potentially, concurrently with step 406), the payment application 114 imports the primary key into a secure key data structure (e.g., in a key store in a TEE, etc.) (e.g., using Android OS security, etc.) in a manner such that only the payment application 114 can access the primary key. As above in reference to FIG. 1, it should be appreciated that when the primary key is generated and/or imported by the payment application 114, the operating system 112 of the communication device 104 stores the primary key in the key data structure.

In any case, as a result of such importation and storage, the primary key is protected from access by the other applications on the communication device 104. It should be appreciated that the primary key, then, will only be accessible after user authentication and available for use once after user authentication. The primary key may be a symmetric key or an asymmetric key pair. In method 400 of FIG. 4, the primary key is an asymmetric key pair. However, one or more other embodiments may be implemented using a symmetric private key. The primary key is not a time-based key, but rather is an operation-based key, whereby for each attempt to access the primary key, the user will need to be authenticated (e.g., via a biometric, etc.). In addition, the primary key will only be available for use once after user authentication (such that after the first use, the user will have to re-authenticate). In connection therewith, the payment application 114 of the communication device 104 prompts, at 408, the user 106 for biometric authentication. In connection therewith, the payment application 114 requests that the operating system 112 capture the biometric of the user 106 and authenticate the user 106. In response to the prompting, the user 106 provides, at 410, a biometric (broadly, a user identifier input) to be captured by the communication device 104, and specifically, the operating system 112, and the operating system 112 of the communication device 104 compares the provided biometric to a biometric reference stored therein in order to authenticate the user 106 (based on a match). The operating system 112 of the communication device 104, then, notifies the payment application 114 of the communication device 104 as to whether the authentication is successful (e.g., with a success or failure message, etc.). That said, it should be appreciated that in more or more embodiments the comparison may be performed external to the communication device 104 (e.g., at a server in communication with the communication device 104, etc.). It should also be appreciated that the biometric reference may even be stored external to the communication device (e.g., at a server, etc.).

In any case, with continued to reference to method 400 of FIG. 4, when the authentication is successful, the communication device 104, and specifically, the payment application 114, at 412, transmits a notification to the account server 102 of the user 106 opting into the multi-function authentication.

The notification transmitted, at 412, includes an indication that the communication device 104 is eligible for the multi-function authentication (e.g., that the device 104 is TEE enabled, etc.) based on the checking by the payment application 114 of the communication device 104 (as discussed above), whereby the account server 102 may confirm that the device 104 is eligible for multi-function authentication (e.g., that the operating system 112 of the communication device 104 supports authentication required for multi-function authentication, that the device 104 includes a TEE (i.e., is TEE-enabled, etc.), that the device 104 includes a biometric sensor, and/or that the device 104 includes at least one enrolled biometric reference, etc.) (broadly, applies the checks). Further, when the primary key is an asymmetric key pair as in method 400, the public key of the key pair is included in the notification transmitted, at 412, to the account server 102. Again, however, one or more other embodiments may be implemented where the primary key is a symmetric key, whereby the notification may not include the primary key in the notification.

Upon receipt of the notification, the account server 102, in turn, transmits, at 414, notification to the third party server 108 of the user 106 opting into the multi-function authentication. The notification transmitted includes an indication that the communication device 104 is TEE-enabled. In addition, the account server 102 stores, at 416, the primary key (i.e., the public key of the asymmetric primary key pair) and a flag (indicating that the communication device 104 is TEE-enabled) in memory (e.g., the memory 204, etc.) and identifies the wallet account/payment application 114 (and the user 106) as opted into the multi-function authentication.

Next in the method 400, where the primary key is used as an encryption key, the account server 102 encrypts, at 418, data, including a transaction PIN (e.g., a virtual wallet PIN, etc.), using the primary key (i.e., the public key of the asymmetric primary key pair) and transmits, at 420, the encrypted data, as well as the secondary key (e.g., stored by the account server 102 at step 312 of method 300, etc.), to the communication device 104, and specifically, to the operating system 112, such that the operating system 112 may pass the encrypted data, and the secondary key, to the payment application 114, whereby the payment application 114 receives the encrypted data, as well as the secondary key. That said, in one or more other embodiments (e.g., where a symmetric primary key is used and/or the transaction PIN is already stored at the communication device 104 (e.g., in a local database) (e.g., in encrypted form), there may be no need for the communication device 104 to provide a primary key to the account server (e.g., in connection with step 412) and/or for the account server 102 to transmit an encrypted transaction PIN to the communication device 104 (e.g., in connection with step 420). With continued reference to the method 300 of FIG. 3, the payment application 114 of the communication device 104 then stores at 422, the encrypted data (including the encrypted transaction PIN) in memory of the communication device 104 (e.g., the memory 204, etc.) (e.g., in a cache, etc.) (e.g., until a successful transaction using the transition PIN is completed, as discussed above in relation to FIG. 1, etc.).

The payment application 114 of the communication device 104, then, may later decrypt the encrypted transaction PIN using the private key of the primary key pair and use the decrypted transaction PIN, together with a token associated with the payment account (broadly, a payment token) to generate a cryptogram for a payment account transaction (e.g., to pass to an NFC-enabled POS terminal via NFC), etc. In any case, the payment application 114 of the communication device 104 further imports, at 424, the secondary key (received in from the account server 102 in connection with step 420) into the secure key data structure (e.g., the key store in a TEE controlled by the operating system 112, etc.) in the communication device 104. As above in reference to FIG. 1, it should be appreciated that when imported by the payment application 114, the operating system 112 of the communication device 104 stores the secondary key in the key data structure, wherein the payment application 114 provides the secondary key to the operating system 112 for storage.

It should be appreciated that where the primary key is used for signing (e.g., signing the transaction PIN, etc.), and instead of encryption, step 418 need not be performed and the transmission at step 420 need not included encrypted data (e.g., and instead may include signed data). Similarly, signed data may be stored at step 422 in lieu of encrypted data.

It should also be appreciated that the secondary key is imported by the payment application 114, at 424, in a manner whereby the time-based secondary key is accessible only upon access to the primary key stored in the communication device 104 (e.g., where the primary key is also stored in the key data structure), wherein the primary key is programmatically linked to the secondary key by the payment application 114. Specifically, for example, when the primary key is generated by the payment application of the communication device 104 and/or when the primary and secondary keys are stored by the operating system 112 of the communication device 104 (e.g., after receipt in the case of the secondary key, etc.), the payment application 114 imports the keys into the key data structure in a manner such that only the payment application 114 can access the keys (e.g., in a key store in a TEE, etc.) (e.g., using Android OS security, etc.). In this manner, the keys are protected from access by other applications on the communication device 104. In connection therewith, payment application 114 employs logic dictating that the secondary key (as linked to the primary key) will only be accessible by the payment application 114 if the primary key is accessed successfully (i.e., if the primary key cannot be accessed (e.g., due to a failure, etc.), the secondary key cannot be accessed) and wherein the payment application 114 will only attempt to access the secondary key if the primary key is successfully accessed.

It should also be appreciated that, through operation of the methods 300 and 400 of FIGS. 3-4, for example, the communication device 104 is now configured to two keys: the operation-based primary key and the time-based secondary key.

Figure 5:
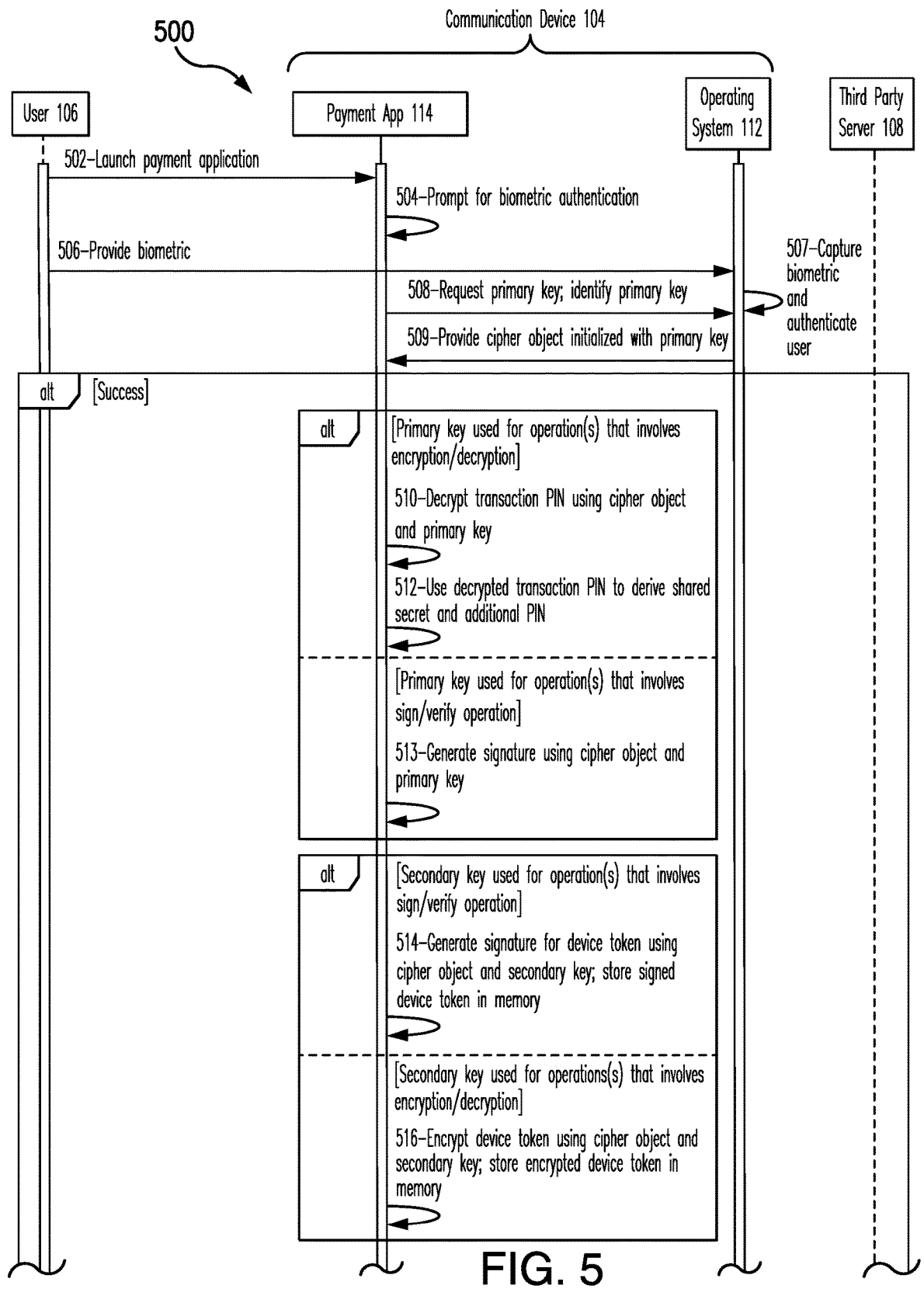
FIG. 5 is a flow diagram of an exemplary method, which may be implemented in connection with the system of FIG. 1, for managing access to keys included in the communication device associated with the user based on authentication of the user.
Figure 5:
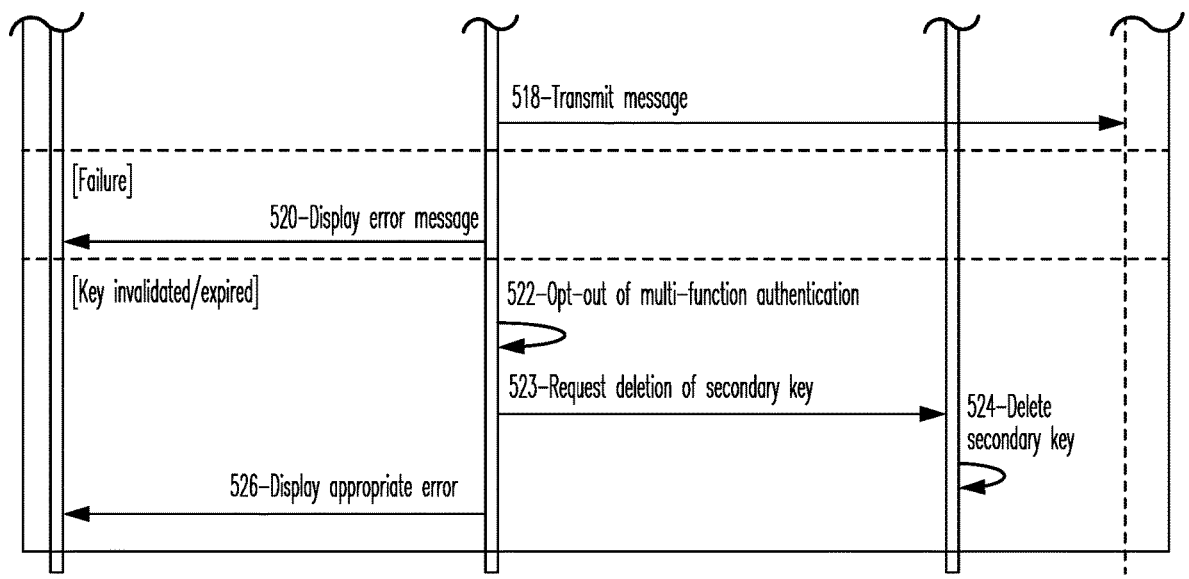

FIG. 5 illustrates an exemplary method 500 for facilitating a payment account transaction to be funded through the payment application 114 of the communication device 104 or other operation with respect to the payment application 114 of the communication device 104 (e.g., fetching transaction history for the payment account, etc.) (broadly, a payment account operation) using biometric authentication (broadly, device level authentication (DLA)). In connection therewith, the user 106 launches the payment application 114, at 502, for example, to fund a payment account transaction. In response, the payment application 114 prompts, at 504, the user 106 to authenticate himself/herself through presentation of a biometric (e.g., a fingerprint, etc.) (broadly, a user identifier input) (broadly, the payment application 114 prompts for biometric authentication). In connection therewith, the payment application 114 may first determine that the communication device 104 is TEE-enabled, has a biometric reference (e.g., fingerprint, etc.) enrolled, etc. In any case, the user 106 then provides, at 506, the biometric to the communication device 104 (and, specifically, the operating system 112), which, in turn, via the operating system 112, captures the biometric and authenticates the user 106 (e.g., by comparing the captured biometric to a reference biometric, etc.), at 507.

In connection with the authentication (e.g., where the user 106 has been authenticated based on a match of the captured biometric to a reference biometric in the comparison, such that the authentication is complete, etc.), the payment application 114 of the communication device 104 retrieves a cipher object (e.g., in response to the operating system 112 notifying the payment application 114 of a successful authentication, etc.), wherein the payment application 114, at 508, informs the operating system 112 that it wants to use the primary key (i.e., the operation-based key) (broadly, requests the primary key) in the key data structure. In connection with requesting the primary key at step 508, the payment application 114 identifies the primary key to the operating system 112. The operating system 112 provides, at 508, a cipher object initialized with the primary key, to the payment application 114. In connection therewith, the operating system 112 retrieves the primary key from the key data structure (based on the identification of the primary key by the payment application 114 to the operating system 112) and initializes the cipher object with the primary key, whereupon the operating system 112 then returns the initialized cipher object to the payment application 114. In the embodiment of method 500 of FIG. 5, the cipher object (e.g., an Android cipher object, etc.) may be advantageously used by the payment application 114 to allow for efficient encryption/decryption of data and/or signing/verifying data (broadly, operations), and the initialized cipher object includes different crypto objects for these different operations (e.g., one crypto object for an encryption operation and a different crypto operation for a sign operation, etc.). However, in other embodiments, other known methods of encryption/decryption or signing/verifying may be used.

In one scenario, the primary key may be used for an operation(s) that involves encryption/decryption (e.g., for a contactless payment requiring decryption of a virtual wallet PIN, etc.). In this scenario after receiving the cipher objet initialized with the primary key (e.g., the private key of the asymmetric primary key pair), the payment application 114 decrypts, at 510, the transaction PIN (e.g., a virtual wallet PIN, etc.) (which is stored, e.g., in a cache in an encrypted form) using the cipher object (and, in particular, a crypto object of the cipher object) and the primary key (with which the cipher object is initialized) (i.e., in this example, the private key of the asymmetric private key pair). The primary key is necessary to decrypt the transaction PIN in method 500 of FIG. 5. And, at 512, the payment application 114 uses the decrypted transaction PIN to derive a shared secret (e.g., for use in secure communication between the communication device 104 and account server 102, etc.) and an additional PIN (e.g., a Mastercard Digital Enablement Services (MDES) PIN, etc.) (e.g., for use in the contactless payment transaction, etc.). The payment application 114 uses the derived shared secret and the additional PIN, together with a token associated with the payment account (broadly, a payment token) and stored securely in the payment application 114, to generate a cryptogram for the payment account transaction (e.g., to pass to an NFC-enabled POS terminal via NFC so that the payment account transaction may be processed, etc.).

In another scenario/alternative, the primary key may be used for an operation(s) that involves a sign/verify operation. In this scenario, after receiving the cipher object initialized with the primary key (e.g., the private key of the asymmetric primary key pair), the payment application 114 generates, at 513, a signature using the cipher object (and, in particular, a crypto object of the cipher object) and the primary key (with which the cipher object is initialized) (i.e., in this example, the private key of the asymmetric primary key pair). The signature may be used by the initialized cipher object to sign a random number, whereby the signed random number may then be sent, by the payment application 114 of the communication device 104, along with other data (e.g., an account number) to the account server 102, where the account server 102 may then verify the signature using the primary key (i.e., in this embodiment, the public key of the primary key pair, etc.). If the signature is successfully verified, the account server 102, then, may transmit a response to the communication device 104 that includes the transaction PIN, where the payment application 114 of the communication device 104 receives the response. It should be appreciated that in connection with verifying the signature, the account server 102 may send the signed random number to the third party server 108 for verification (e.g., via an API, etc.), whereby the third party server 108 may verify and authenticate the communication device 104 of the user 106 in connection with the payment account operation and report back to the account server 102 the result of the verification, etc.).

In either of the above alternative/scenarios (or potentially, in lieu thereof), the primary key may also be used as part of an operation(s) that involves a sign/verify operation using the secondary key (a time-based key) (e.g., where the third party (e.g., an issuer) associated with the third party server 108 participates in biometric authentication). In this case, the payment application 114 of the communication device 104 retrieves a cipher object, wherein the payment application 114 informs the operating system 112 that it wants to use the secondary key in the key data structure, whereby the secondary key may be accessed (e.g., retrieved, etc.) from the key data structure by way of the primary key (which, again, is programmatically linked to the secondary key). In connection therewith, the payment application 114 identifies the secondary key to the operating system 112. The secondary key is then retrieved by the operating system 112 within the defined interval of the secondary key (again, a time-based key). The operating system 112, then, provides a cipher object initialized with the secondary key, to the payment application 114. In connection therewith, the operating system 112 retrieves the secondary key from the key data structure (based on the identification of the secondary key by the payment application 114 to the operating system 112) and initializes the cipher object with the secondary key, whereupon the operating system 112 then returns the initialized cipher object to the payment application 114. The payment application 114, then, generates, at 514, a signature for the device token stored in memory 204 (within the defined interval) using the cipher object (and in particular, a crypto object of the cipher object) and the secondary key (with which the cipher object is initialized) (whereby the device token is signed using the secondary key) and stores the signed data in memory (e.g., caches the device token in a session, etc.). The payment application 114 then provides (e.g., transmits, etc.), at 518, a message with the signed device token (e.g., in a payload of the message, etc.) to the third party server 108 associated with the third party (e.g., via an API, etc.) for authentication of the communication device 104 of the user 106, whereby the third party server 108 may verify the signature using the secondary key as part of the authentication (e.g., for a payment account operation).

Also in either of the above alternatives/scenarios (or potentially, in lieu thereof), the primary key may instead (or additionally) be used as part of an operation(s) that involves encryption/decryption using the secondary key. In this case, the payment application 114 of the communication device 104 retrieves a cipher object, wherein the payment application 114 informs the operating system 112 that it wants to use the secondary key in the key data structure, whereby the secondary key may be accessed from the key data structure by way of the primary key (which, again, is programmatically linked to the secondary key). In connection therewith, the payment application 114 identifies the secondary key to the operating system 112. The secondary key is then retrieved by the operating system 112 within the defined interval of the secondary key (again, a time-based key). The operating system 112, then, provides a cipher object initialized with the secondary key, to the payment application 114. In connection therewith, the operating system 112 retrieves the secondary key from the key data structure (based on the identification of the secondary key by the payment application 114 to the operating system 112) and initializes the cipher object with the secondary key, whereupon the operating system 112 then returns the initialized cipher object to the payment application 114. The payment application 114, then, at 516, encrypts data (e.g., the device token, etc.) using the cipher object (and in particular, a crypto object of the cipher object) and the secondary key (with which the cipher objet is initialized) (within the defined interval) and stores the encrypted data in memory 204 (e.g., caches the data in a session, etc.). The payment application 114 then provides (e.g., transmits, etc.), at 518, a message with the encrypted data (e.g., including the device token, etc.) (e.g., in a payload of the message, etc.) to the third party server 108 for authentication of the communication device 104 of the user 106, whereby the third party server 108 may decrypt the data using the secondary key as part of the authentication for the payment account operation.

In the method 500, regardless of the above operation, after the primary key and/or the secondary key is successfully accessed for the above scenarios and/or cases, the payment application 114 may transmit, at 518, a message to the third party server 108 (e.g., via an API, etc.), which is encrypted and/or signed by the secondary key, where the message is related to one or more services (e.g., a web service(s) such as for payment and/or to view transaction history, etc.) associated with the third party server 108.

The message may include various data. For example, in the one scenario, where the primary key for an operation(s) that involves an encryption/decryption (e.g., for a contactless payment requiring decryption of a virtual wallet PIN, etc.) (consistent with steps 510 and 512), the message to the third party server 108 may include a signed device token. In the other scenario, where the primary key for an operation(s) that involves a sign/verify operation (consistent with step 513), the message may include the signed random number (as discussed above). In the case where a sign/verify operation is performed using the secondary key (a time-based key) (consistent with step 514), the message may include the signed device token, whereby the third party server 108 may verify the signature using the secondary key (as discussed above). In the case where an encryption/decryption is performed using the secondary key (consistent with step 516), the message may include the encrypted device token, whereby the third party server 108 may decrypt the data using the secondary key (as discussed above).

In view of the above, it should be appreciate that the third party (e.g., an issuer, etc.) associated with the third party server 108 may opt to employ user/device authentication based on the primary key (operation-based key) and/or based on a secondary key (time-based key) for purposes of authenticating the communication device 104 of the user 106 in connection with one or more services (e.g., a web service(s) such as for payment and/or to view transaction history, etc.).

Separately in the method 500, when operating system 112 is unable to authenticate the user 106 at 507 (i.e., the authentication fails), an error message is displayed, at 520, by the payment application 114, at the communication device 104, to the user 106 (e.g., in response to a notification of the failure from the operating system 112, etc.), whereupon the user 106 may be prompted to re-enter the biometric input (e.g., at 506, etc.) or the payment application 114 may be terminated. It should be appreciated that different messages and/or errors, or next steps may be employed when the authentication of the user 106 fails.

Figure 7:
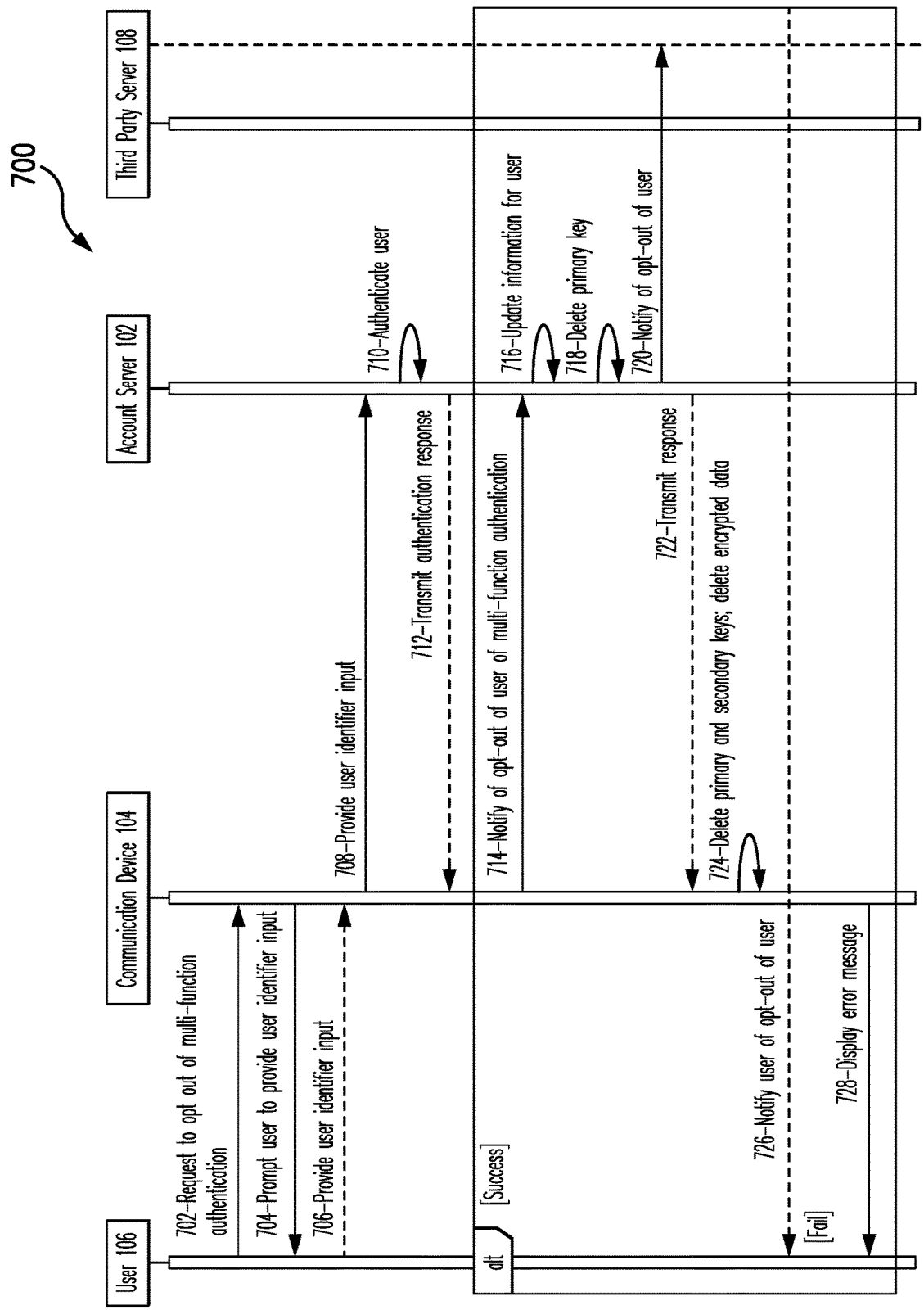
FIG. 7 is a flow diagram of an exemplary method, which may be implemented in connection with the system of FIG. 1, for the user to opt out of the multi-function authentication feature.

Additionally, when the user 106 launches the payment application 114, but the primary key has been deleted (by the operating system 112) from the key data structure when the primary key is expired and/or invalidated (e.g., due to a new user being added to the communication device 104, and/or a new biometric being registered to the communication device 104, etc.), payment application 114 opts, at 522, the user 106 and/or the payment application 114 out of the multi-function authentication (e.g., consistent with steps 714 through 724 of method 700 of FIG. 7 discussed below, whereby the payment application 114 may notify the account server 102 of the opt out in response to deletion, etc.), and further, at 523, requests that the operating system 112 delete the secondary key. In response to the request, the operating system 112, then, at 524, deletes the secondary key (i.e., the time-based key) from the key data structure (e.g., the key store, etc.) in memory (e.g., the memory 204, etc.). In connection therewith (e.g., in response to a notification from the operating system 112 that the secondary key has been deleted), the payment application 114 displays, at 526, an appropriate error to the user 106, such that the user 106 is informed of the terminated access to the operations of the payment application 114 and/or a way to register the communication device 104 to be able to opt back into the multi-function authentication.

Figure 6:
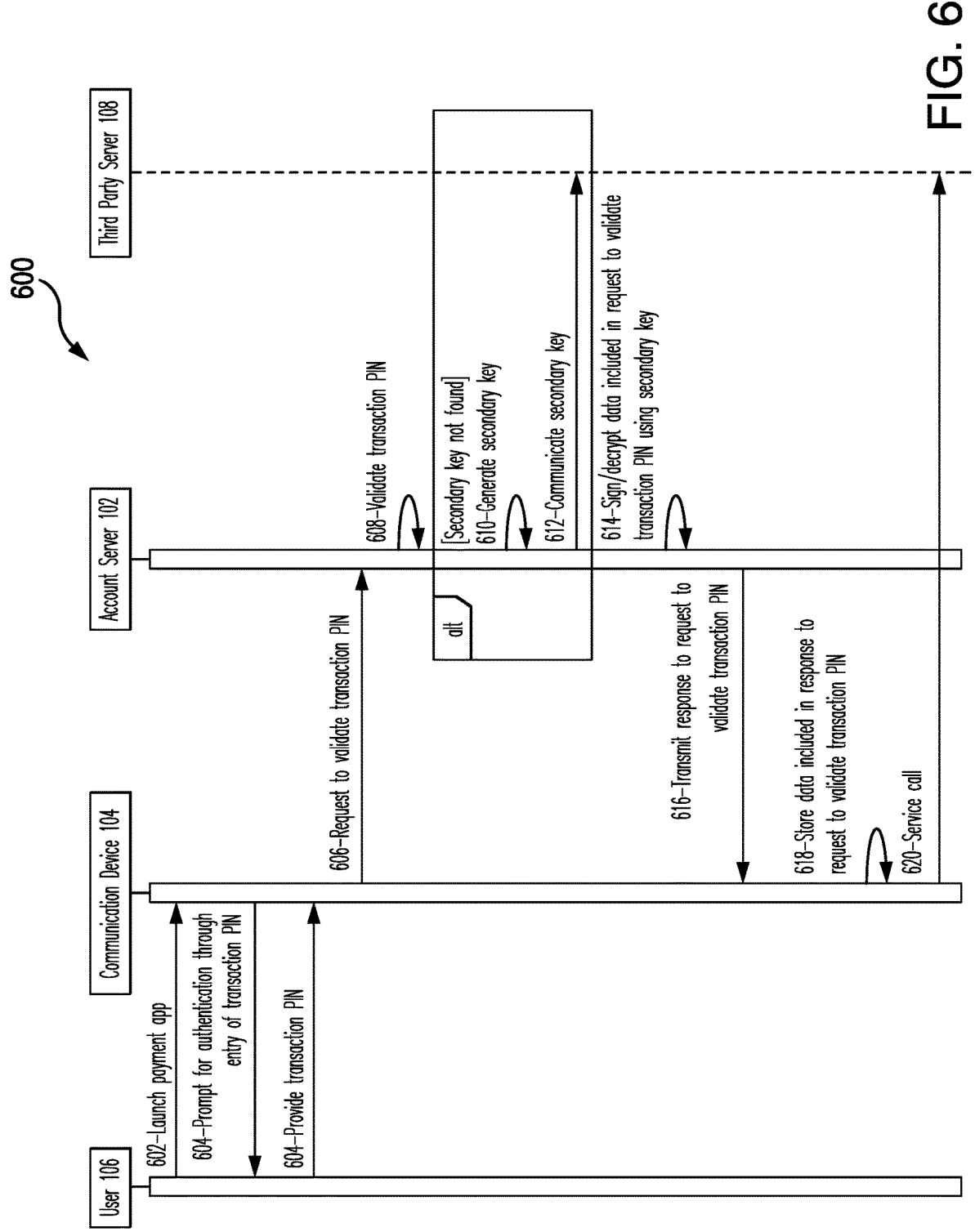
FIG. 6 is a flow diagram of an exemplary method, which may be implemented in connection with the system of FIG. 1, for providing PIN-based authentication of the user.

FIG. 6 is an exemplary method 600 for facilitating a payment account transaction to be funded through the payment application 114 of the communication device 104 or other operation with the respect to the payment application 114 of the communication device 104, when biometric authentication is not used and/or possible (e.g., when a reference biometric is not stored at the communication device 104 or when the communication device 104 is not biometrically enabled, etc.) (broadly, pin-based authentication). In connection therewith, when the user 106, launches the payment application 114, at 602, for example, to fund a payment account transaction, the payment application prompts, at 604, the user 106 to authenticate himself/herself through entry of a transaction PIN (e.g., a virtual wallet PIN, etc.). The user 106 provides the transaction PIN to the payment application 114, at 605, and the payment application 114 of the communication device 104 then submits a request to validate the transaction PIN, at 606, to the account server 102. The request to validate the transaction PIN includes the transaction PIN (e.g., in encrypted form) and other data (e.g., third-party data (e.g., the device token, etc.), etc.). The account server 102 receives the validation request and, at 608, validates the transaction PIN (e.g., by comparing the data included in the request (e.g., the transaction PIN, etc.) with reference data (e.g., a transaction PIN stored at the account server 102 and associated with the device token included in the request, etc.).

The account server 102, then, determines whether a secondary key (a time-based key) specific and/or unique to the user 106 and/or the communication device 104 is available at the account server 102 (e.g., in memory 204) to decrypt and/or sign the data included in the validation request (e.g., the transaction PIN and other data (e.g., third-party data (e.g., the device token, etc.), etc.). The determination may be made, for example, based on whether there is a secondary key stored at the account server 102 (e.g., in a secure zone, etc.) that is associated with a unique wallet ID for the user. When a secondary key is not found, the account server 102 generates, at 610, a secondary key (again, including a time-based key), specific and/or unique to the user 106 and the communication device 104. Once generated, the account server 102, at 612, communicates (e.g., propagates, etc.) the secondary key to the third party server 108 (e.g., via a SetTimeBasedKey or other API, etc.). The account server 102 also stores the secondary key at the account server 102 (e.g., in a secure zone, etc.) (e.g., such that the secondary key is associated with the unique wallet ID, etc.).

In any case, after the secondary key is generated or when a secondary key specific and/or unique to the user 106 and/or the communication device 104 is already available at the account server 102, the account server 102, at 614, signs and/or decrypts the data included in the validation request using the secondary key. The account server 102, then, at 616, transmits a response, including the signed and/or decrypted data, to the request to validate the transaction PIN to the communication device 104, whereby the payment application 114 of the communication device 104 receives the response. The data included in the response, as received, will be signed if a secondary key was used by the account server 102 to sign and/or verify the data or decrypted if the secondary key was used by the account server 102 to decrypt the data. The payment application 114 of the communication device 104, at 618, then stores the data (e.g., caches the data in memory 204, etc.). The payment application 114 of the communication device 104 then, at 620, makes a service call (e.g., a web service call, etc.) to the third party server 108. The service call includes the data included in the response to the request to validate the transaction PIN. The service call is related to one or more services (e.g., a web service, etc.) associated with the third party server 108.

FIG. 7 is an exemplary method 700 for opting the user 106 out of the multi-function authentication (e.g., biometric DLA, etc.), after previously opting in or enrolling in the multi-function authentication. The user 106 provides an input to the payment application 114 of the communication device 104, requesting, at 702, to opt out of the multi-function authentication. In response, the payment application 114 of the communication device 104 prompts the user 106 to provide a user identifier input (e.g., a PIN (e.g., a transaction PIN, etc.), a biometric, etc.), at 704, whereupon, at 706, the user 106 provides the user identifier input to the payment application 114. Thereafter, the communication device 104 and specifically, the payment application 114, provides, at 708, the user identifier input to the account server 102.

In turn, the account server 102 authenticates, at 710, the user 106 when the user identifier input matches a reference (e.g., stored in the account server 102, or at a remote computing device, etc.). When the account server 102 authenticates the user 106, the account server 102 transmits an authentication response including notification of the successful authentication, at 712, back to the communication device 104, whereby the communication device 104, and in particular the payment application 114, receives the response. In response, the communication device 104, and specifically, the payment application 114, notifies, at 714, the account server 102 of the opt out (or un-enrollment) of the user 106 from the multi-function authentication. The account server 102 updates, at 716, information for the user 106 relating to the multi-function authentication (e.g., that multi-function authentication is not available for the user 106, etc.) and deletes, at 718, the primary key (i.e., the public key of the asymmetric primary key pair) from its key data structure. The account server 102 then notifies, at 720, the third party server 108 of the opting out of the user (thereby permitting the third party server 108 to delete the secondary key). The user 106 is then transitioned from biometric (e.g., DLA, etc.) to transaction PIN-based authentication, whereby the biometric authentication (e.g., consistent with method 500 of FIG. 5) is flipped to transaction PIN-based authentication (e.g., consistent with method 600 of FIG. 6). And, the account server 102 additionally transmits a response, at 722, to the communication device 104 (whereby the payment application 114 of the communication device 104 receives the response), which permits the communication device 104 and specifically, the operating system 112, to delete, at 724, the primary and secondary keys from the key data structure and also delete the encrypted data received, for example, at 316 of FIG. 3. In connection therewith, it should be appreciated that the payment application 114, requests that the operating system 112 delete the primary and secondary keys and the encrypted data, whereupon the operating system 112 deletes the same, at 724, in response to the request by the payment application 114. In turn, the payment application 114 of the communication device 104 notifies, at 726, the user 106 of the opting out or un-enrollment of the user 106 from the multi-function authentication.

With that said, if the user is not authenticated by the account server 102 (at 710), the account server 102, at 712, transmits an authentication response including notification of the unsuccessful authentication, at 712, back to the communication device 104, whereby the communication device 104, and in particular the payment application 114, receives the response and displays an error message to the user 106, at 728, indicating that the attempt to opt out of the multi-function authentication failed.

In view of the above, the systems and methods herein permit a single authentication in a dual key scheme, whereby a single authentication of the user provides access to both keys, with the primary key employed for one operation (for payment via a payment application, for example) and the secondary key employed for another operation (e.g., interactions with the third party, etc.), without the user being authenticated multiple times to access the multiple keys. In connection therewith, device level authentication is improved, by way of increased security and greater efficiency.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein. As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a communication device, a request from a user to opt into multi-function authentication; (b) in response to the request, generating, by the communication device, a primary key, wherein the primary key is an operation-based key, the operation-based key accessible based on authentication of the user and available for use after the authentication; (c) importing, by an application of the communication device, the generated primary key into a secure key data structure of the communication device, such that the primary key is only accessible by the application; (d) after generating the primary key, prompting, by the communication device, the user for biometric authentication; (e) in response to the prompting, receiving, by the communication device, a biometric of the user; (f) after receiving the biometric, comparing the biometric of the user to a reference biometric; (g) when the biometric of the user matches the reference biometric, transmitting, by the communication device, to an account server an indication that the user is eligible for multi-function authentication; (h) in response to the transmission: receiving, by the communication device from the account server, a secondary key, wherein the secondary key is a time-based key useable only during a defined interval; and linking, by the application of the communication device, the secondary key to the primary key and importing the secondary key in the secure key data structure of the communication device, such that the secondary key is only accessible via the primary key, whereby the user is opted into the multi-function authentication.

In view of the above, one or more embodiments of this disclosure include a computer-implemented method for enabling multi-function authentication of a user, the method comprising at least one or more of the following operations: (a) receiving, by a payment application of a communication device, a request from a user to opt into multi-function authentication; (b) in response to the request, generating, by the payment application of communication device, a primary key, wherein the primary key is an operation-based key, the operation-based key accessible based on authentication of the user and available for use after the authentication; (c) importing, by the payment application of the communication device, the generated primary key into a secure key data structure of the communication device, such that the primary key is only accessible by the application; (d) after generating the primary key, prompting, by the payment application of the communication device, the user for biometric authentication; (e) when the biometric authentication is successful, transmitting, by the payment application of the communication device, to an account server, an indication that the user is eligible for multi-function authentication; (f) in response to the transmission: receiving, by the payment application of the communication device from the account server, a secondary key, wherein the secondary key is a time-based key useable only during a defined interval; and linking, by the application of the communication device, the secondary key to the primary key and importing the secondary key into the secure key data structure of the communication device, such that the secondary key is only accessible via the primary key, whereby the user is opted into the multi-function authentication.

In one or more embodiments, generating, by the payment application of the communication device, the primary key, includes calling the operating system of the communication device to create the primary key. In one or more embodiments, in response to the calling of the operating system of the communication device to create the primary key, creating, by the operating system of the communication device, the primary key and storing, by the operating system of the communication device, the primary key in the secure key data structure of the communication device.

In one or more embodiments, importing, by the payment application of the communication device, of the generated primary key into the secure key data structure includes a call to the operating of the communication device to store the primary key.

In one or more embodiments, the payment application of the communication device, in connection with the prompting of the user for biometric authentication, requests the operating system of the communication device to authenticate the user. In one or more embodiments, the operating system, in response to the request to authenticate the user, receives the biometric of the user and, after receiving the biometric, compares the biometric of the user to a reference biometric. In one or more embodiments, the operating system of the communication device, when the biometric of the user matches the reference biometric, notifies the payment application of the communication device of the successful biometric authentication.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for enabling multi-function authentication of a user, the method comprising:
   receiving, by a communication device, a request from a user to opt into multi-function authentication;
   in response to the request, generating, by the communication device, a primary key, wherein the primary key is an operation-based key, the operation-based key accessible based on authentication of the user and available for use after the authentication;
   importing, by an application of the communication device, the generated primary key into a secure key data structure of the communication device, such that the primary key is only accessible by the application;
   after generating the primary key, prompting, by the communication device, the user for biometric authentication;
   when the biometric authentication is successful, transmitting, by the communication device, to an account server, an indication that the user is eligible for multi-function authentication; and
   in response to the transmission:
      receiving, by the communication device from the account server, a secondary key, wherein the secondary key is a time-based key useable only during a defined interval; and
      linking, by the application of the communication device, the secondary key to the primary key and importing the secondary key into the secure key data structure of the communication device, such that the secondary key is only accessible via the primary key, whereby the user is opted into the multi-function authentication.

2. The method of claim 1, further comprising:
after the user is opted into the multi-function authentication, and in connection with funding a payment account transaction:
   authenticating, by the communication device, the user based on a received biometric;
   accessing, by the communication device, the primary key from the secure key data structure;
   initializing, by the communication device, a cipher object with the primary key;
   decrypting, by the communication device via the cipher object, a transaction PIN;
   generating, by the communication device, a cryptogram based on the decrypted transaction PIN and a payment token associated with a payment account; and
   passing, by the communication device, the cryptogram to a point-of-sale terminal, thereby enabling the payment account transaction to be processed.

3. The method of claim 1, further comprising:
after the user is opted into the multi-function authentication, and in connection with a payment account operation:
   authenticating, by the communication device, the user based on a received biometric;
   accessing, by the communication device, the primary key from the secure key data structure;
   initializing, by the communication device, a cipher object with the primary key;
   signing, by the communication device via the cipher object, a random number using the primary key;
   transmitting the signed random number to the account server; and
   in response to the transmission of the signed random number, receiving a response including a transaction PIN.

4. The method of claim 1, further comprising:
after the user is opted into the multi-function authentication, and in connection with a payment account operation:
   authenticating, by the communication device, the user based on a received biometric;
   accessing, by the communication device, the secondary key from the secure key data structure via the primary key;
   initializing, by the communication device, a cipher object with the secondary key;
   generating, by the communication device, a signature for a device token, the signature based on the cipher object and the secondary key, the device token unique to the communication device; and
   transmitting the signed device token to a third party server associated with an issuer, thereby enabling the third party server to verify the signature for the payment account operation.

5. The method of claim 1, further comprising:
after the user is opted into the multi-function authentication, and in connection with a payment account operation:
   authenticating, by the communication device, the user based on a received biometric;
   accessing, by the communication device, the secondary key from the secure key data structure via the primary key;
   initializing, by the communication device, a cipher object with the secondary key;

encrypting, by the communication device via the cipher object, data including a device token; and transmitting the encrypted data to a third party server associated with an issuer, thereby enabling the third party server to decrypt the data and authenticate the communication device for the payment account operation.

6. The method of claim 1, further comprising:

deleting, by the communication device, the primary key from the secure key data structure; and based on the deletion of the primary key from the secure key data structure, deleting, by the communication device, the secondary key from the secure key data structure.

7. The method of claim 6, wherein the primary key is deleted from the secure key data structure in response to an expiration or invalidation of the primary key.

8. The method of claim 7, wherein the expiration or invalidation is based on at least one of the following: a new user being added to the communication device and a new biometric being registered to the communication device.

9. The method of claim 6, wherein the primary key and the secondary key are deleted from the secure key data structure in response to the user requesting to opt out of the multi-function authentication.

10. The method of claim 1, further comprising, in response to the transmission:

receiving, by the communication device from the account server, signed and/or encrypted data and storing the signed and/or encrypted data in memory of the communication device, the encrypted data including an encrypted transaction PIN, wherein the transaction PIN is signed and/or encrypted with the primary key.

11. The method of claim 10, further comprising, when the biometric authentication is successful, transmitting, by the communication device, to the account server, the primary key in connection with transmitting the indication that the user is eligible for multifunction authentication.

12. The method of claim 11, wherein the primary key includes a primary key pair, the primary key pair including a private key and a public key; and wherein transmitting the primary key consists of transmitting the public key.

13. The method of claim 1, further comprising storing an encrypted transaction PIN in a memory of the communication device prior to the transmission.

14. The method of claim 1, wherein the indication that the user is eligible for multi-function authentication is based on at least one of an operating system of the communication device, a determination that the communication device includes a trusted execution environment, a determination that the communication device includes a biometric sensor, and a determination that the communication device includes an enrolled biometric reference.

15. The method of claim 1, wherein the application of the communication device is a virtual wallet application.

16. The method of claim 1, where the secondary key is generated by the account server in response to the transmission.

17. The method of claim 1, wherein the primary key is available for use only once after the authentication of the user.

18. A system for enabling multi-function authentication of a user, the system comprising:

a processor configured, by computer-executable instructions, to:

receive a request from a user to opt into multi-function authentication;

in response to the request, generate a primary key, wherein the primary key is an operation-based key accessible based on authentication of the user and available for use after the authentication;

import the generated primary key into a secure key data structure;

after generating the primary key, prompt the user for biometric authentication;

when the biometric authentication is successful, transmit, to an account server, an indication that the user is eligible for multi-function authentication; and in response to the transmission:

receive, from the account server, a secondary key, wherein the secondary key is a time-based key useable only during a defined interval; and link the secondary key to the primary key and import the secondary key into the secure key data structure, such that the secondary key is only accessible via the primary key, thereby opting the user into the multi-function authentication.

19. The system of claim 18, wherein the processor is further configured, by the computer-executable instructions, to:

based on a deletion of the primary key from the secure key data structure, request deletion of the secondary key from the secure key data structure.

20. The system of claim 18, wherein the primary key is available for use only once after the authentication of the user.

* * * * *